Jan. 8, 1963 M. J. BLOCK 3,072,742
GENERATION OF OPTICAL SURFACES
Filed June 29, 1959 3 Sheets-Sheet 1

INVENTOR.
Myron J. Block
BY
Roberts, Cushman & Grover,
ATT'YS.

Jan. 8, 1963 M. J. BLOCK 3,072,742
GENERATION OF OPTICAL SURFACES
Filed June 29, 1959 3 Sheets-Sheet 2
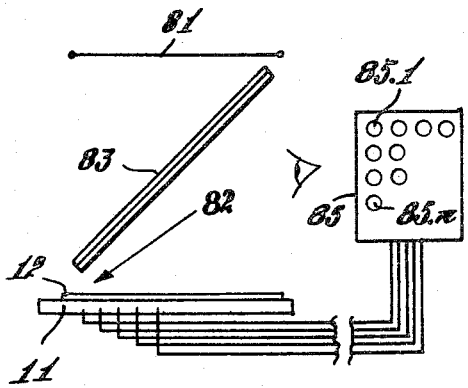
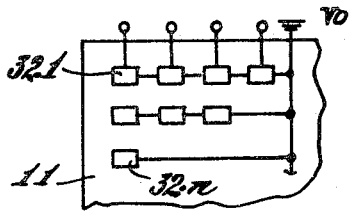
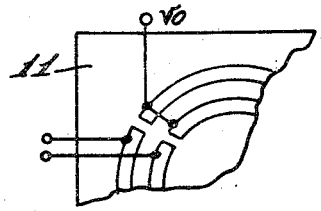
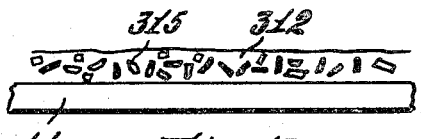
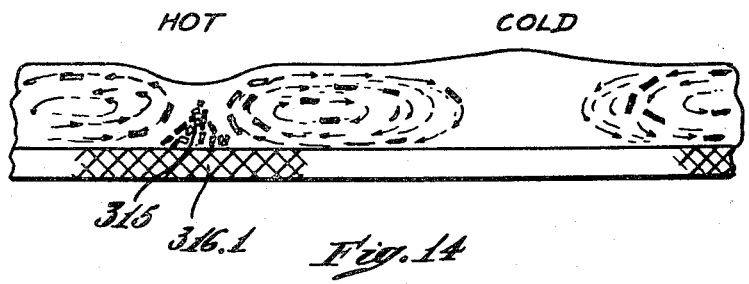
INVENTOR.
Myron J. Block
BY
Roberts, Cushman & Grover
ATT'YS Jan. 8, 1963 M. J. BLOCK 3,072,742
GENERATION OF OPTICAL SURFACES
Filed June 29, 1959 3 Sheets-Sheet 3

INVENTOR.
Myron J. Block
BY
Roberts, Cushman & Grover,
ATT'YS

United States Patent Office 3,072,742
Patented Jan. 8, 1963

3,072,742
GENERATION OF OPTICAL SURFACES
Myron J. Block, Cambridge, Mass., assignor, by mesne assignments, to Block Engineering, Inc., Cambridge, Mass., a corporation of Delaware
Filed June 29, 1959, Ser. No. 823,750
28 Claims. (Cl. 178—7.5)

The field of the present invention is that of methods and apparatus for generating optical surfaces which are curved according to a predetermined pattern or configuration under the control of a generating pattern applied to a surface; the invention further includes various practical applications based on the generation or optical evaluation of free surfaces formed according to the invention.

It has heretofore been proposed to use liquid surfaces as optical deflectors, and it has also been proposed to generate on unconfined liquids reflecting or refracting optical surfaces for imaging purposes. Among these, so-called "Eidophor" devices have been particularly proposed for producing arbitrary optical surfaces, but these and similar devices depend for successful operation on instrumentalities, such as special liquids and cathode rays, which are complicated, cumbersome and for practical purposes difficult of procurement and control, and also limited as to dimensions, range of control, and reliability.

Objects of the invention are among others, to shape the free surface of a liquid in a manner which does not depend on complex and expensive devices such as vacuum sealed apparatus, to provide such surfaces on various types of liquids which are suitable for various purposes including the preservation of the once generated free surface shape by solidification, to provide for the amplification of the optical effect of such free surface curvature patterns by easily available and inexpensive means, to provide for the utilization of free surface optical elements for purposes of optical feedback, directly or by means of intermediary signal channels of non-optical type, to provide for the generation on a free liquid surface of a reflecting or refracting pattern, pictorial or otherwise in terms of definitely predeterminable varying curvature or slope, by means of purely thermal energy with or without amplification of the optical pattern generating energy by means of auxiliary electrical or thermal energy, to provide for the generation, temporarily or permanently, of optical surfaces without conventional surface shaping instrumentalities, merely by application thereto of a thermal image pattern, and to provide optical structures capable of effecting optical modification according to a predetermined pattern by means of oriented light affecting elementary areas.

The nature and substance of the present invention can be shortly summarized as being based on the recognition that the surface of a thin liquid layer can be shaped to assume curvatures with slopes which are proportional to a temperature pattern applied to for example the flat free surface of the liquid which is flat so long as its temperature is evenly distributed. In one aspect of the invention, this slope determining temperature pattern is applied by means of an optical image carrying information in terms of energy differentials between adjacent elementary pattern areas. Such wave energy may be within or contain the visible ranges so that the present invention is applicable to devices and methods utilizing visible light, including the controlled and predetermined modification of optical imaging properties. In another aspect, the invention utilizes thermal patterns applied to a free liquid surface by means of heating elements which are independent of the wave energy on the surface, and whose temperature can be extraneously controlled at will.

In an important aspect of the invention, the shaping effect of a thermal image of either one of the above-mentioned types, upon a free liquid surface may be amplified by the application of a uniform transverse thermal or electrical field, or by the application of a uniform transverse current; in the latter instance, further amplification can be obtained by choosing a liquid having a negative coefficient of resistivity which causes an increase of the temperature differentials of the liquid applied thereto by the controlling thermal pattern.

In a further important aspect of the invention, an original thermally defined image pattern is detected or modified by applying this thermal image pattern on the free surface of a liquid layer of the above characterized type, and by utilizing the free surface physical image pattern in terms of slope, for gaining information about the original thermal pattern, such as by directly reflecting or refracting wave energy with the free surface pattern, or by detecting the latter by means of auxiliary contrivances such as shadow graphic schlieren or interferometric methods.

Also in accordance with the invention, the image carrying free surfaces of a liquid can be rendered permanent by solidifying the liquid while the original thermal generating image is applied thereto.

In an additional very important practical aspect of the invention, optical feedback can be obtained by applying an image pattern to a free surface of a liquid layer as above characterized, by then deriving a thermal image pattern from the original image on the free surface, and by applying the derived thermal pattern with controlled intensity and in register to the original pattern; in this manner an elementary curvature pattern can be maintained on the free surface for modifying the original image pattern in predetermined manner. Instead of using the above characterized purely optical feedback, a non-optical signal link can be interposed, for example in terms of time dependent signal modulation as exemplified by a closed television channel; according to this aspect, the feedback signal can be automatically or manually modified by adding energy or information, either arbitrarily imposed or derived from the controlled device itself.

These and other objects and aspects of the nature of the invention will appear from the herein presented outline of its principles, its mode of operation and its practical possibilities together with a description of several typical embodiments illustrating its novel characteristics.

The description refers to drawings in which:

FIGS. 8 to 10 are schematical views illustrating devices for generating free surface patterns according to the invention;

FIG. 13 is a transverse section, similar to FIG. 1, through a free surface liquid layer with particles dispersed therein; and FIG. 14 is a transverse section similar to FIG. 13, illustrating the thermal image generation in a layer according to FIG. 13.

Figure 1:
FIG. 1 is a schematical transverse section through a thin liquid layer on a support, modified according to the invention by a thermal pattern applied thereto.

In FIG. 1, numeral 11 denotes a support such as a glass or synthetic polymer plate, and 12 is a thin layer of liquid resting on or attached to the support by molecular attraction. A heat pattern is applied as indicated by the two cross-hatched areas 15 and 16, which pattern can be generated and if desired amplified, in various ways to be described hereinbelow with reference to FIGS. 3 to 5. Various liquids have been found to be operative, such as water or kerosene. Especially suitable are commercial silico-hydrates such as the fluid obtainable under the trade designation "Dow-Corning 200—10 cs." This is a silicone oil with a viscosity of about 10 cs. Layers of this fluid of a thickness of about 0.2 mm. serve quite well for purposes of the invention. As FIG. 1 indicates, the heated area develops concave distortions whose slope and depth depends upon the temperature gradient prevailing at the particular area, parallel to the support. As indicated at FIG. 1, a more intense heat pattern area 17 may produce a depression of steeper slope and greater depth.

In addition to the above-mentioned liquids such as silicone fluids, organic substances can be used which are ordinarily in liquid state but can be hardened by compounding for polymerization until these compounds become solid. Excellent for this purpose are thermosetting epoxy resins compounded to harden within not less than five minutes.

It will thus be evident that a given temperature distribution within a thin liquid layer produces a surface distortion that can be used to deflect surface reflected or refracted light, and can therefore be used to provide optical surfaces of any desirable configuration without restriction to available tools.

Figure 2:
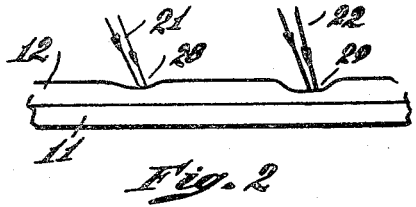
FIG. 2 is a schematical section similar to FIG. 1, illustrating the application of free surface controlling patterns by means of wave energy.

FIG. 2 illustrates the generation of free surface imaging patterns according to the invention by means of wave radiation, indicated as ray pencils 21 and 22 of different intensity indicated by rays 22 being drawn thicker than rays 21. The free surface pattern conforms in terms of slope to this differential, as indicated at 28 and 29.

Figure 3:
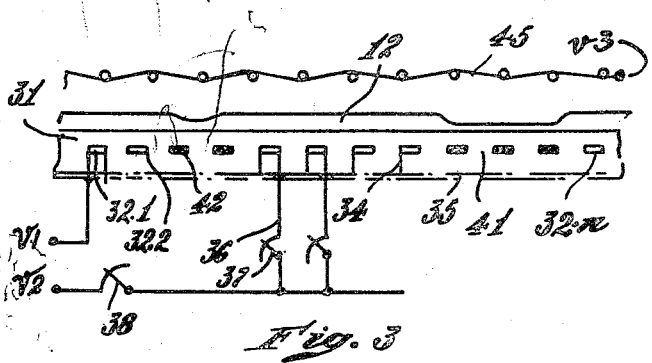
FIG. 3 illustrates, similarly to FIGS. 1 and 2, the amplification of free surface generation according to the invention by means of superimposed electrical or thermal fields or of currents, and it also illustrates the application of a controlling thermal pattern by means which also serve for applying auxiliary amplifying field.

FIG. 3 indicates the possibility of applying the thermal pattern directly by means of heater elements embedded in the support for the free surface liquid. In FIG. 3, the support 31 carries a free surface liquid layer, again labeled 12. The support 31 is made of suitable insulating material and contains heating elements 32.1, 32.2, ... 32.n each of which can be individually heated, constituting an electrical resistance with a common lead brought out to the metallized back surface 35 of 31, and with individual lead wires 36 brought out through holes in layer 35, as indicated for elements 32.5 and 32.6. In this fashion each heating element can be individually controlled by connecting the common conductor 35 to a potential $v1$ and the individual leads 36 to another potential $v2$, and by providing individual rheostats 37 as well as a common rheostat 38. In this manner it is possible to apply a uniform basic potential to the heating elements 32.1, etc., and an individual heating current to each of the heating elements. FIG. 3 indicates that strongly heated elements 41 will effect a deeper and more steeply sloped free surface distortion, as contrasted to the effect of the lesser heated element 42.

FIG. 3 also illustrates a practical procedure of applying amplifying uniform heat to the bottom of the liquid layer, namely by applying to the elements 32.1 etc. a basic, uniform heating current which elevates the overall temperature of the system above the ambient temperature which is approximately that of layer 35. Temperature gradients suitable for this purpose were found to be in the order of magnitude of 1.25° C./cm. By applying a potential $v3$ between the layer 35 and a metallic screen 45 arranged at a small distance from the free surface, an electric field will be established between 45 and 35 which field, it was found, considerably amplifies the effect of the heat pattern. If it is desired to apply this amplifying effect to an arrangement according to FIG. 2, a simple metallic grid within the supporting plate 11, or a resistance plate of the so-called "NESA" type on the back thereof can be used.

If, in an arrangement according to FIG. 3, the potential difference between the conductors on either side of the liquid layer is raised above the break-down level of the gap, approximately 5000 volts, a corona discharge will take place causing a current to flow transversely through the liquid layer. It was found that this current also supplies amplification and that this amplification can be reinforced by making the resistance coefficient of the liquid negative, in the following manner. At elementary areas where the generating thermal pattern is of comparatively high intensity, the transverse resistivity of the liquid layer will be lower due to the negative coefficient, and hence the heat electrically generated at these areas will likewise be higher. Furthermore, the thickness of the liquid being smaller at these heated areas, the resistance of the latter will be lower for this mechanical reason and the temperature raised.

Figure 4:
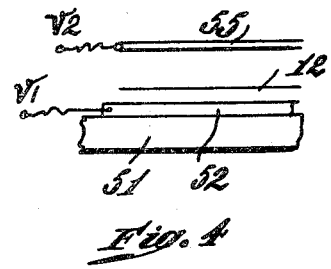
FIG. 4 illustrates in a manner similar to FIGS. 1 to 3 amplification by means of a transverse current.

FIG. 4 shows an arrangement according to the invention which is intended only for generating free surface images by means of wave energy, without the use of thermally heated pattern elements. In this embodiment, 51 represents a supporting plate such as of glass, whereas 52 is a metal (such as aluminum) layer upon which rests the liquid layer 12. A semi-transparent metal screen 55 is arranged in front of the liquid layer 12 such that optical radiation can penetrate therethrough without essential image deterioration or energy loss. It will now be evident that the electric field and current, as well as temperature amplifications above described can be applied in this instance.

Figure 5:
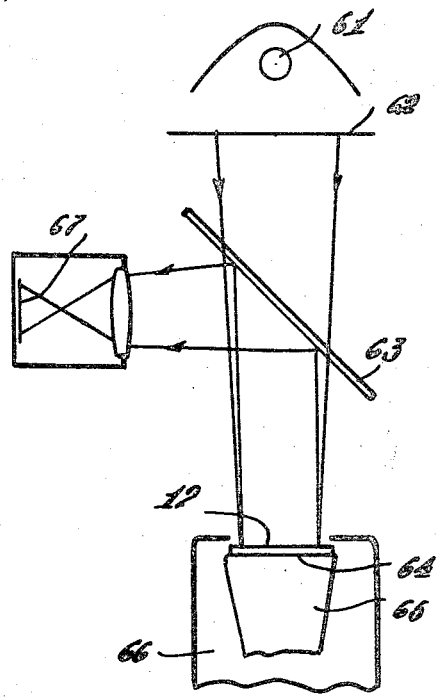
FIG. 5 is a schematical representation of a device for demonstrating and investigating the thermal generation of optical surfaces according to the invention.

Referring now to FIG. 5 a further possibility of generating a free surface pattern by means of an image in terms of thermal energy will be explained by way of a device which also permits the visual demonstration of the free surface phenomenon which forms the basis of the present invention.

In FIG. 5, numeral 61 denotes a light source which illuminates an object screen 62 carrying an object for example a rectangular grid pattern. The light from the source 61 projects a shadow of the grid 62, also passing through a conventional beam splitter 63. The light finally impinges on a liquid layer 12 according to the invention, on the front 64 of a cathode ray tube 65, such as incorporated in a conventional television receiver or oscillograph 66. As indicated in FIG. 5, the image of 62 is reflected back from 12 by 63 into an observation or recording device such as the camera 67. In a practical embodiment, the layer 12 consisted of the above mentioned Dow-Corning 200—10 cs. fluid and was about 0.2 mm. thick, deposited on the face of the oscilloscope cathode ray tube placed with its face horizontal. A thin layer of black paint covered the face of the tube to prevent undesirable reflection of the glass surface. At the same time the figure traced out by the electron beam of the tube 65 could be seen through the thin layer of paint. The conformity of the heat producing cathode ray image traced on the screen 65 with the free surface pattern generated thereby can be easily observed by means of the distortion, caused by the free surface distortion, of the image of the pattern 62. It was observed that the electron beam of the oscilloscope tube provides enough energy to deform the thin layer of oil deposited on the face of the cathode ray tube. The pattern and the strength of the deformation of the image observed at 67 are controlled by the trace and the intensity of the cathode ray beam respectively.

Figure 6:
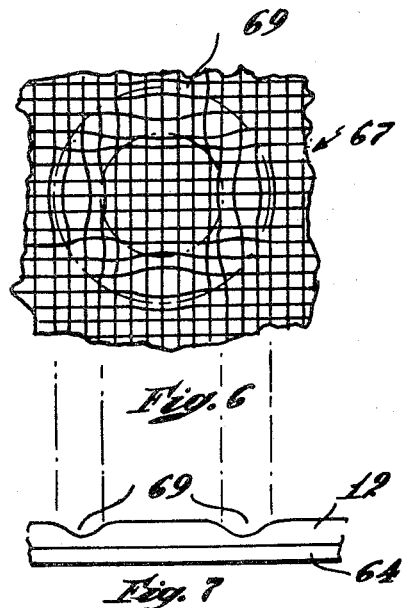
FIG. 6 illustrates an image pattern obtained by means of apparatus according to FIG. 5.
Figure 7:
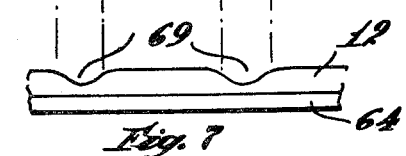
FIG. 7 is a transverse section through a liquid layer that effects a pattern according to FIG. 6.

FIG. 6 illustrates the effect of a circular cathode ray trace 69 on the image plane of device 67 clearly indicating that the distortion thereon was caused by a free surface distortion, as shown in FIG. 7. It will be evident that where the free surface is convex the image at 67 of a straight line rectangular grid pattern, such as shown at 62 of FIG. 5, will show a crowding of wires whereas a concave surface shows up as a dilation of the grid spacing. This is due to the fact that light from the grid is made less divergent through reflection of the concave mirror.

The above described observation device indicates that the distortion of the free surface according to the deformation consists principally of concavities. With a liquid layer as above described and the thermal intensity furnished by a conventional cathode ray beam, the alteration in the trace pattern of the tube was found to change the liquid surface deformation within a period of the order of one second. This response time increases with the viscosity of the liquid and decreases with thickness and thermal conductivity of the liquid layer.

With a device according to FIG. 5 it can be proved that electrostatic effects are not responsible for the surface deformations according to the invention, as follows. The above described experiment was repeated with a grounded layer of conducting silver paint interposed between the face of the tube and the oil layer. In spite of this the surface deformations appeared as readily as before and with the same order of magnitude and exactitude. It was found that the liquid layer can be adapted for any requirements such as those now to be described.

With reference to FIG. 8, a device will be described by means of which optional surfaces can be generated according to specifications. In FIG. 8, an object field 81 which may be at infinity such as the starred sky, or at a finite distance, is protected on a free surface liquid device that is controllable according to FIGS. 1 to 5. FIG. 8 illustrates by way of example an arrangement according to FIG. 3. An optical viewing device 82 permits by means of a semi-transparent reflector 83, the observation of the free liquid surface as modified by 81. The support 11 is equipped with heating elements such as explained with reference to FIG. 3, whose leads are brought out to a control panel 85 with rheostat knobs 85.1, 85.2, . . . 85.n, which permit individual adjustment of each element. The control knobs 85.1 to 85.n correspond to the resistors 37 of FIG. 3 and it will be understood that a common ground can be easily provided, as for instance shown in FIG. 3 and also in FIGS. 9 and 10.

Instead of a rectangular heat generating pattern as shown in FIG. 9, circular patterns such as shown in FIG. 10 will often be preferable, for example for dealing with refracting or reflecting surfaces, such as compensating plates for Schmidt reflectors.

An arrangement of this type offers various possibilities; a primary pattern can be generated under continuous observation or an existing pattern 81 can be modified by means of the individual controls 85.1 etc., the changes being observed at 82. If the surface layer 12 is a solidifying polymer as above described a permanent surface pattern can be generated.

Figure 11:
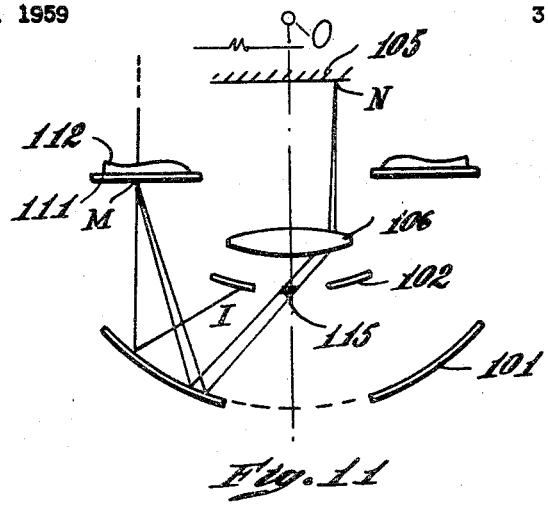
FIG. 11 is a schematical representation of an optical imaging system of the Schmidt type illustrating the direct optical feedback generation according to the invention, of a corrective plate.

With reference to FIG. 11, an embodiment of the present invention for providing direct optical feedback for purposes of a Schmidt system, will now be described.

In FIG. 11, numeral 101 denotes the principal imaging mirror of a conventional Schmidt system and 102 is the apertured mirror, or optical element of equivalent function, located in the focal surface of 101. At 111 is an annular support for a free surface liquid layer 112 according to the invention, placed as customary for the corrective lens of such systems. A solid mirror 105 and a lens 106 are arranged as indicated. An object point O, for example at infinity such as a star, is imaged at I, the locus of the schlieren disc array 115. The lens 106 images any point M of the support 111, at point N on the mirror 105, the ray pencils between the points M and N passing through the locus of the schlieren disc array 115, so that the aberration of the system, manifesting itself at 115, produces a radially varying but annularly constant energy distributed over the mirror 105. The mirror 105 reflects an intensity pattern and these intensities are thus imaged at 111 and produce in the free surface liquid layer 112 slopes which automatically compensate for the said aberration. It will be understood that FIG. 11 is schematical and that the ray tracing will have to be adapted to specifications at hand. As well known, compensating surfaces of this type require only very slight curvatures for the purpose of correcting the spherical aberration of the Schmidt system, and the free surface modifications obtainable according to the invention are wholly sufficient in that respect. The amount of aberration and the curvature of the free surface correction disc are correlated for proper functioning of the latter by adjusting the diameter of the schlieren disc 115 such as to transmit the energy needed, but no more or less, for effecting the required corrective free surface distortion of the liquid layer 112.

Figure 12:
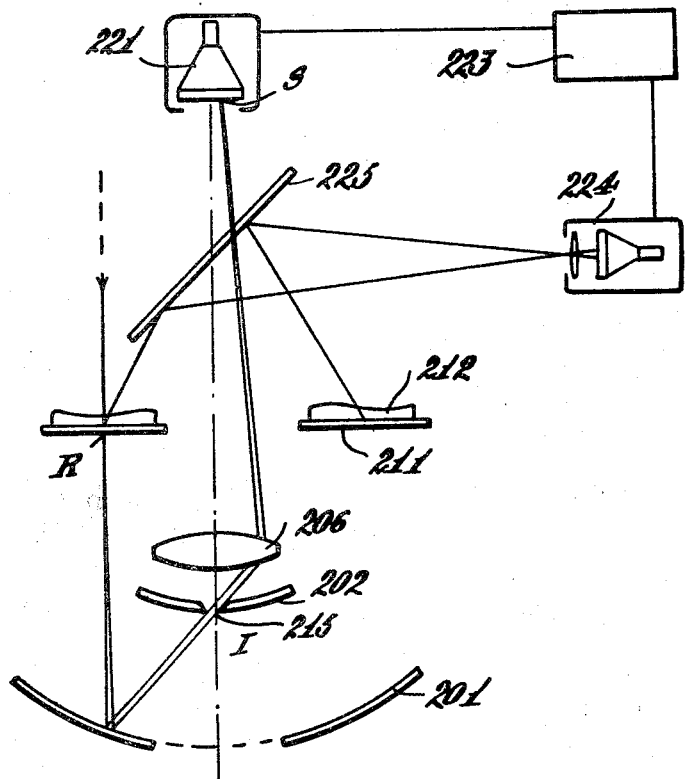
FIG. 12 is a representation similar to FIG. 11, of an optical feedback system containing an electrical signal link.

FIG. 12 illustrates, in a manner similar to FIG. 11, an optical feedback system which includes a non-optical link in the feedback loop. The Schmidt system shown in FIG. 12 comprises a principal mirror 201, a focal plane mask 202 with an adjustable schlieren aperture array 215, a field lens 206 and a corrector plate support 211. An object such as O at infinity is imaged at I in the focal plane 202, whereas a point R at the compensator plate 211 is imaged at a point S on the screen of a conventional television camera tube 221.

The schlieren aperture modulates a focal area at I, whose intensity corresponds to the aberration of 201, which is projected onto the screen of the cathode ray tube 221 when it is transmitted as the signal of a closed television type circuit 223 to a projector tube apparatus 224 which, by means of the semi-reflecting mirror 225, projects an image which conforms to that at S, onto the free surface liquid layer 212 which accordingly assumes a shape that compensates for the aberration detected at 215. It will be understood that the components 221, 223 and 225 are of conventional design and can easily be adapted as to size, intensity and sign (positive or negative) of the images, according to requirements.

The electrical signal transmitting channel 223 can be used in this and analogous set-ups to superimpose extraneous information upon that which is inherent in the feedback loop proper and it will also be understood that the intensity of the feedback signal can be easily regulated in this manner, in addition to adjusting the aperture array 215.

It will be evident that optical feedback systems of the above described type can be analogously adapted for various purposes.

FIGS. 13 and 14 illustrate the utilization of the free surface fluid configuration according to the invention for purposes of orienting, by the flow which must accompany the free surface deformation, optically or otherwise heterogeneous particles which are dispersed in the fluid layer. FIG. 13 shows on a support 11 a fluid layer 312 containing randomly arranged particles 315 dispersed in the fluid proper and having no pattern effect in this condition. FIG. 14 indicates, similarly to FIG. 1 heated zones 316.1, 316.2 which cause a flow pattern as indicated by the flow lines 137 and the arrows applied thereto. The particles 315 are oriented by and follow the flow or accumulate in the stagnant areas as indicated in FIG. 14, thus forming a physical pattern which can be observed directly or by means of polarized light that conforms to the thermal pattern 316.1, 316.2 and can be utilized for various purposes including those pointed out above.

FIG. 14 indicates the probable mechanism of the free surface deformation as follows. Both the surface deformation and the accompanying flow are produced by a stress tangential to the free surface due to variations in the surface tension which in turn are caused by temperature gradients.

In the above described embodiment using as the liquid a silicone compound, an operative layer thickness in apparatus according to FIG. 5 was 1.26 mm. Generally speaking, the slope of the surface can be determined from the formula:

$$a = 3/2\ [(ds/dT)(dT/dx)/wgh]$$

wherein $ds/dt$ is the temperature coefficient of surface tension, $aT/dx$ is the temperature gradient, $w$ is the density of the fluid, $g$ is the gravitational acceleration, and $h$ is the liquid film thickness. It was found that for most practical purposes the usable thickness is less than 2 mm.

The particles shown in FIGS. 13 and 14 can be aluminum powder or, for polarization purposes they consist of unsymmetrical particles of refractive index different from the liquid such as a $V_2O_5$ sol or domains constituted by a flow-birefringent liquid such as p-azo oxy anisole.

The support for the liquid layer is not necessarily flat; it will be evident that layers of the above thickness magnitudes will be retained by adhesion on curved, or inclined flat, surfaces.

It should be understood that the present disclosure is for the purpose of illustration only and that this invention includes all modifications and equivalents which fall within the scope of the appended claims.

I claim:

1. The method of forming a relief image on a liquid layer capable of forming a continuously free surface which is temperature dependent such that it assumes a surface pattern of elementary curvatures and slopes whose location and magnitude correspond to temperature differentials between adjacent portions of the surface, comprising the steps of:
   imposing on a free surface of said liquid layer an original image pattern in terms of thermally effective energy variation between adjacent pattern elements thereby to induce formation of said free surface pattern; and
   deflecting wave radiation impinging on said free surface pattern with said elementary curvatures and slopes;
   whereby the configuration of the original image pattern can be expressed in terms of the free surface pattern which can in turn be used to detect, display, preserve, or modify the original image pattern or an image pattern derived therefrom.

2. Method according to claim 1, comprising the additional step of subjecting said liquid layer to an essentially uniform electric field transverse thereof.

3. Method according to claim 1 comprising the additional step of subjecting said liquid layer to an essentially uniform electric current transverse thereof.

4. Method according to claim 1 comprising the further step of subjecting said liquid layer to an essentially uniform temperature differential between the surfaces thereof.

5. Method according to claim 1, wherein said free surface pattern is translated into a schlieren pattern for further utilization.

6. Method according to claim 1 wherein the liquid of said layer is of the thermosetting type, and comprising the further step of solidifying said thermosetting layer by application of an elevated temperature while the original thermally effective pattern is applied thereto.

7. The method of controlling a wave array carrying an image pattern in terms of thermal energy variation between adjacent elementary image pattern areas by means of a free surface of a liquid layer whose surface tension and slope is temperature dependent such that it assumes a pattern of elementary curvatures and slopes whose location and magnitude are derived from thermal energy variation between elementary surface areas, which method comprises the steps of:
   imposing said image pattern on said free surface such that the surface derives therefrom a curvature and slope pattern; and
   superimposing said derived free surface pattern at controlled intensity and in register on said array;
   whereby said free surface pattern can be maintained for modifying the wave array in predetermined manner.

8. The method of controlling a wave array carrying an image pattern in terms of thermal energy variation between adjacent elementary image pattern areas by means of a free surface of a liquid layer whose surface tension and slope is temperature dependent such that it assumes a pattern of elementary curvatures and slopes whose location and magnitude are derived from thermal energy variation between elementary surface areas, which method comprises the steps of:
   deriving from said image pattern a schlieren pattern indicative of an aberration characteristic of the image pattern;
   imposing said schlieren pattern on said free surface such that the surface derives therefrom a curvature and slope pattern; and
   superimposing said derived free surface pattern at controlled intensity and in register on said array; whereby said free surface pattern can be maintained for modifying the wave array in predetermined manner.

9. The method of controlling a wave array carrying a primary image pattern by means of a free surface of a liquid layer whose surface tension and slope is temperature dependent such that said free surface assumes a pattern of elementary curvatures and slopes whose location and magnitude are derived from thermal energy variations between elementary surface areas, which method comprises the steps of:
   translating said wave image pattern into a conformal electrical signal pattern;
   retranslating said electrical signal pattern into an image pattern in terms of thermally effective energy variations between elementary areas conforming to said wave image pattern;
   imposing said thermally effective image pattern on said free surface such that the surface derives therefrom a curvature and slope pattern; and
   superimposing said retranslated free surface pattern in register on said array;
   whereby the free surface pattern can be maintained for modifying the wave array in predetermined manner including addition of energy and information.

10. The method of reproducing an original image pattern by means of a free surface of a liquid layer containing particles heterogeneous thereto and sufficiently small to remain in suspension therein, the surface tension and slope of the liquid layer being temperature dependent such that it assumes a pattern of elementary curvatures and slopes and said particles travel in elementary turbulence paths, with said curvatures, slopes and turbulence paths derived as to location and magnitude from thermal energy variation between elementary surface areas, which method comprises the steps of:
   imposing said image pattern in terms of thermally effective energy variations between adjacent elementary pattern areas on said free surface such that the surface derives therefrom a curvature and slope pattern; and deflecting wave radiation impinging on said free surface with the pattern formed by said particles in said turbulence paths and in the stagnant areas intermediate thereof.

11. Method according to claim 10, wherein said liquid is a thermosetting compound which is liquid at a given temperature but solidifies at a higher temperature;

whereby the free surface pattern can be rendered permanent while the original thermally effective image is imposed thereon.

12. A device for producing an original image pattern which comprises: a liquid layer having a continuously free surface whose surface tension and slope is temperature dependent such that said surface assumes a pattern of elementary curvatures and slopes whose location and magnitude correspond to temperature differentials between adjacent portions of the surface; and means for imposing on said free surface said original image pattern in terms of thermally effective energy variation between adjacent elementary image pattern areas; whereby the configuration of the original image pattern can be expressed in terms of the free surface pattern which can in turn be used to detect, display, or modify the original image pattern or an image pattern derived therefrom.

13. Device according to claim 12 wherein said liquid layer consists essentially of a silico-hydrate compound.

14. Device according to claim 12 wherein said liquid layer has a thickness of less than approximately 2 mm.

15. Device according to claim 12 further comprising means for applying a uniform electric field transversely of said liquid layer.

16. Device according to claim 12 further comprising means for applying a uniform temperature differential transversely of said liquid layer.

17. Device according to claim 12 further comprising means for applying a uniformly distributed electrical current transversely of said liquid layer.

18. Device according to claim 12, wherein the liquid of said layer is of the type which can be solidified while said original image pattern is imposed thereon;

whereby the configuration of original image pattern can be preserved.

19. A device for reproducing an original image pattern carried by a wave array, which comprises: a liquid layer whose surface tension and slope is temperature dependent such that a free surface thereof assumes a pattern of elementary curvatures and slopes whose location and magnitude correspond to temperature differentials between adjacent portions of the surface; two conductive screen means, one on each side, respectively, of said liquid layer; means for applying energy to said screen mean to establish an energy field therebetween, through said free surface; and means for imposing on said free surface said wave image pattern in terms of thermally effective energy variation between adjacent elementary image pattern areas; whereby the configuration of the original image pattern can be expressed in terms of the deflection and the deflection pattern can be amplified by applying an electric or thermal field between the screen means transversely of the liquid layer.

20. A device for reproducing an image pattern which comprises: a supporting plate; on one side of said plate a liquid layer whose surface tension and slope is temperature dependent such that a free surface thereof assumes a pattern of elementary curvatures and slopes whose location and magnitude correspond to temperature differentials between adjacent portions of the surface; on the other side of said plate a pattern of heating elements for imposing on said plate and on said free surface said image pattern in terms of thermally effective energy variation between adjacent heating elements; whereby the configuration of the image pattern can be expressed in terms of the free surface pattern which can in turn be used to detect, display, or modify the image pattern or an image pattern derived therefrom.

21. A device according to claim 20 wherein said heating elements are resistor means, and further comprising means for applying predetermined electric currents to individual ones of said resistor means.

22. A device for reproducing an image pattern, which comprises: a supporting plate; on one side of said plate a liquid layer whose surface tension and slope is temperature dependent such that a free surface thereof assumes a pattern of elementary curvatures and slopes whose location and magnitude correspond to temperature differentials between adjacent portions of the surface; adjacent to said fluid layer side of said plate metallic screen means; on the opposite side of said plate a pattern of conductor means; means for applying predetermined electric currents to individual ones of said conductor means for imposing on said plate and said free surface said image pattern in terms of thermally effective energy variation between adjacent conductor element pattern areas; and means for applying an electric potential difference to said conductor means and said screen means; whereby the configuration of the image pattern can be expressed in terms of the free surface pattern which can in turn be used to detect, display, or modify the original image pattern or an image pattern derived therefrom, and the free surface pattern can be amplified by an electric field or a current or both, transversely of said fluid layer.

23. A device for demonstrating an image pattern generated by a thermal pattern on a free liquid surface which comprises: cathode ray apparatus having a screen and means for tracing on the screen by an electron beam an image pattern in terms of thermally effective energy variation between adjacent elementary image pattern areas; on the outside of said screen a liquid layer whose surface tension and slope is temperature dependent such that a free surface thereof assumes a pattern of elementary curvatures and slopes whose location and magnitude correspond to electronically generated temperature differentials between adjacent portions of the screen; an object field representing a geometrical pattern; means for projecting said geometrical pattern on said screen; transparent reflector means obliquely inserted between said screen and said object field; and image detecting means in the beam deviated by said reflector means; whereby the configuration of said electronically traced image pattern and the free surface pattern generated by the electron trace can be observed and compared.

24. A device for reproducing an original image pattern which comprises: cathode ray apparatus having a screen and means for tracing on the screen with an electron beam an image pattern in terms of thermally effective energy variation between adjacent elementary image pattern areas; and on the outside of the screen a liquid layer whose surface tension and slope is temperature dependent such that a free surface thereof assumes a deflection in terms of elementary curvatures and slopes whose location and magnitude corresponds to temperature differential between adjacent portions of said screen; whereby the configuration of the original image pattern can be expressed in terms of the free surface deflection which can in turn be used to detect, display, or modify the original image pattern or an image pattern derived therefrom.

25. A reflectively imaging optical system comprising: a focusing mirror; a plane mirror; between said focusing mirror and said plane mirror a solid optical element having a central window in the focal surface of said focusing mirror; a schlieren disc system centrally placed in said window; between said plane mirror and said optical element a transparent supporting plate; on said supporting plate a liquid layer whose surface tension and slope is temperature dependent such that a free surface thereof assumes a pattern of elementary curvatures and slopes whose location and magnitude correspond to temperature differentials between adjacent portions of the layer; and between said plane mirror and said optical element a lens system for imaging points of said supporting plate at said plane mirror through said window and said schlieren disc system; whereby aberration dependent energy is detected by the schlieren disc and by the plane mirror directed towards the supporting plate where it causes the liquid layer to maintain a free surface configuration continuously corrective of aberration of the principal mirror and adjustable by the schlieren disc system.

26. A reflectively imaging optical system comprising: a principal focusing mirror; a plane mirror; a transparent supporting plate; on said plate a liquid layer means whose surface tension and slope is temperature dependent for imparting to a free surface thereof a pattern of elementary curvatures and slopes whose location and magnitude correspond to temperature differentials between adjacent portions of the layer; transparent semi-reflector means placed obliquely to the optical axis of said focusing mirror and said supporting plate; between said semi-reflector means and said focusing mirror a solid optical element having in the focal plane of said focusing mirror a schlieren aperture; television camera means having light sensitive screen means facing said semi-reflector means on the side opposite to said focusing mirror; between said optical element and said semi-reflector means a lens system for imaging prints of said supporting plate at said screen means; electrically actuated light projector means transversely facing said semi-reflector means at the side of said focusing mirror; and an electric signal transmission link between said camera means and said projector means; whereby aberration dependent energy is detected by the schlieren aperture and by the lens system through the semi-reflector means directed towards the screen means of the camera means, the optical image on the screen means is converted to an electrical signal which is reconverted by the projector means to optical intelligence directed by the semi-reflector means towards the supporting plate where it causes the liquid layer to maintain a free surface configuration continuously corrective of aberration of the focusing mirror, and whereby the configuration of the free surface can be modified by means of the electric transmission link in predetermined manner including addition of energy and information.

27. A device for reproducing an original image pattern comprising: a supporting plate; on said plate a liquid layer having a continuously free surface whose surface tension and slope is temperature dependent such that said free surface assumes a pattern of elementary curvatures and slopes whose location and magnitude correspond to temperature differentials between adjacent portions of the surface; suspended in said liquid layer solid particles; and means for imposing on said free surface said image pattern in terms of thermally effective energy variation between adjacent elementary image pattern areas; whereby the configuration of said image pattern can be expressed in terms of said free surface pattern and the flow and distribution of said particles, which can in turn be used to detect, display, or modify the original image pattern or an image pattern derived therefrom.

28. A device for reproducing an original image pattern which comprises:
cathode ray apparatus having means for tracing with an electron beam an image pattern in terms of thermally effective energy variation between adjacent elementary image pattern areas;
and associated with said beam a liquid layer whose surface tension and slope is temperature dependent such that a free surface thereof assumes a deflection in terms of elementary curvatures and slopes whose location and magnitude corresponds to temperature differentials between adjacent portions of said screen, said liquid layer consisting essentially of a liquid of the type which can be solidified while said thermally effective electron beam pattern is applied thereto;
whereby the configuration of the original image pattern can be expressed in terms of the free surface deflection which can in turn be used to detect, display, preserve or modify the original image pattern or an image pattern derived therefrom.

References Cited in the file of this patent
UNITED STATES PATENTS

| | | |
|---|---|---|
| 2,251,984 | Cleaver | Aug. 12, 1941 |
| 2,335,659 | Fraenckel | Nov. 30, 1943 |
| 2,454,144 | Epstein | Nov. 16, 1948 |
| 2,619,531 | Weighton | Nov. 25, 1952 |
| 2,623,183 | Buck | Dec. 23, 1952 |
| 2,723,305 | Raibourn | Nov. 8, 1955 |